United States Patent [19]

Harms et al.

[11] Patent Number: 5,194,612
[45] Date of Patent: Mar. 16, 1993

[54] REACTIVE DYESTUFFS

[75] Inventors: Wolfgang Harms; Frank-Michael Stöhr, both of Odenthal; Karl-Heinz Schündehütte, Leverkusen, all of Fed. Rep. of Germany

[73] Assignee: Bayer Aktiengesellschaft, Leverkusen, Fed. Rep. of Germany

[21] Appl. No.: 859,641

[22] Filed: Mar. 23, 1992

Related U.S. Application Data

[63] Continuation of Ser. No. 657,925, Feb. 20, 1991, abandoned.

[30] Foreign Application Priority Data

Mar. 3, 1990 [DE] Fed. Rep. of Germany ....... 4006792

[51] Int. Cl.$^5$ ............................................. C07D 239/24
[52] U.S. Cl. .................... 544/327; 544/334; 544/335
[58] Field of Search ................... 544/327, 334, 335

[56] References Cited

FOREIGN PATENT DOCUMENTS 1165661 1/1969 United Kingdom .
1564288 2/1980 United Kingdom .

OTHER PUBLICATIONS

Jaeger et al., Chemical Abstract, 107(8), 1986, #60644a.

*Primary Examiner*—Robert T. Bond
*Assistant Examiner*—Y. N. Gupta
*Attorney, Agent, or Firm*—Sprung Horn Kramer & Woods

[57] ABSTRACT

Reactive dyestuffs of the formula

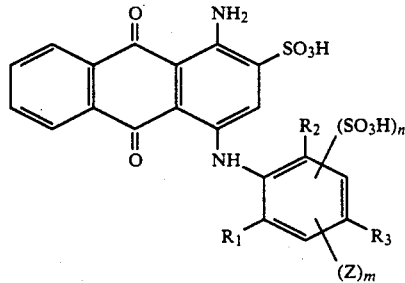

in which the substituents have the meanings given in the description, are highly suitable for the dyeing and printing of hydroxyl- and nitrogen-containing materials, such as cellulose, wool, silk, polyamides, polyurethanes.

6 Claims, No Drawings

REACTIVE DYESTUFFS

This application is a continuation of application Ser. No. 657,925, filed Feb. 20, 1991 now abandoned.

The present invention relates to dyestuffs of the formula (I)

in which $Z = -CH_2-N(R_4)-$ [pyrimidine with Cl, F]

$R_1 = C_1-C_2$-alkyl, $SO_3H$
$R_2 = C_1-C_2$-alkyl, Z
$R_3 = H$, $C_1-C_4$-alkyl, $SO_3H$
$R_4 = H$, substituted or unsubstituted $C_1-C_4$-alkyl
$m = 0$ or $1$
$n = 0$ or $1$ with the proviso that m is 0, if $R_2$ is Z, and n is 0, if $R_1$ and/or $R_3$ is $SO_3H$.

Examples of suitable alkyl radicals $R_3$ are methyl, ethyl, 1-propyl, 2-propyl, 1-butyl, 2-butyl, tert.-butyl.

Examples of suitable alkyl radicals $R_4$ are $C_1-C_4$-alkyl radicals which are unsubstituted or substituted by OH, sulpho, sulphato, cyano or chlorine, such as methyl, ethyl, propyl, butyl, 2-hydroxyethyl, 2-sulphatoethyl, carboxymethyl, 2-carboxyethyl, 2-sulphoethyl, 2-cyanoethyl, 2-chloroethyl.

Preferred dyestuffs I are those o the formula (II)

in which
$R_3' = C_1-C_4$-alkyl
and those of the formulae (IIIa)

and (IIIb)

and those of the formula (IV)

in which
$R_1'$ and $R_2' = c_1-C_2$-alkyl and
$R_3'' = c_1-c_2$-alkyl.

Particularly preferred dyestuffs are dyestuffs of the formulae II–IV in which $R_4$ is H or $CH_3$.

The dyestuff of the formula (V)

is very particularly preferred.

The dyestuffs of the formula I are prepared by condensing compounds of the formula

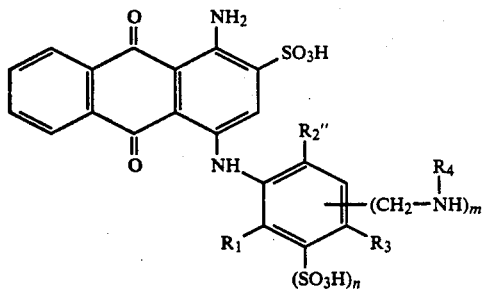

in which

R$_1$, R$_3$, R$_4$, m and n have the abvoementioned meaning and R$_2''$=c$_1$-C$_2$-alkyl or in the case where m is 0

with 5-chloro-4,6-difluoropyrimidine (VII).

The condensations of (VI) with (VII) are carried out in aqueous or aqueous-organic medium at temperatures between 0° and 80°, preferably 20°-50°, and at pH values between 3 and 10, preferably 5-9, in the presence of basic compounds, such as aqueous alkali metal hydroxide, alkali metal carbonate, alkali metal bicarbonate or alkali metal phosphate solutions or of organic tertiary bases, such as trialkylamines, diazabicyclooctane or pyridine. When the reaction is carried out in aqueous-organic medium, apolar aprotic solvents, such as dimethylformamide, N-methylpyrrolidone, dimethylacetamide or caprolactam are preferably used as organic components and glycols, glycol ethers or polyglycol ethers as protic solvents.

Compounds VI are known. They can be prepared, for example, in the following manner:

Either a sulpho group and the function —CH$_2$—N-H—R are introduced in any desired order into suitably substituted 1-amino-4-(alkylarylamino)anthraquinone-2-sulphonic acids by Einhorn condensation with N-(hydroxymethyl)carboxamides or -N-alkylamides or -N-(hydroxymethyl)urethanes, followed by hydrolysis, or 1-amino-2-sulpho-4-bromo-anthraquinone is condense with suitably substituted aminobenzylamines, N-(aminobenzyl)carboxamides, N-(aminobenzyl)urethanes, and the product is sulphated or sulphated and hydrolysed, if desired in any desired order.

The new dyestuffs are suitable for the dyeing and printing of hydroxyl- and N-containing textile materials, of native and regenerated cellulose and of wool, silk, synthetic polyamides and polyurethanes.

The formulae given in the description are those of the free acids. In general, the salts of these acids, in particular the alkali metal salts, preferably the sodium salts, potassium salts or lithium salts are used for the dyeings. In the examples, the temperatures are given in ° C.

EXAMPLE 1

30 g of 1-amino-4-(2'-aminomethyl)-4'-methyl-phenylamino)-anthraquinone-2,6'-disulphonic acid are suspended at 25°-30° in 300 ml of water and dissolved at a pH of 7 with the addition of about 30 ml of 2N NaOH. 10.5 g of 5-chloro-4,6-difluoropyrimidine melted at about 50° are then added dropwise over a period of about 30 minutes, and the pH is still maintained at 6.5-7.0 by dropwise addition of 2N sodium hydroxide solution. The pH and the abovementioned temperature are maintained for several more hours until the consumption of sodium hydroxide solution has come to a complete standstill and the anthraquinone educt has been converted completely into the condensation product as checked by chromatography.

The dyestuff solution obtained is salted out at 50° with sodium chloride, the precipitated product is filtered off with suction and washed with 25 % strength sodium chloride solution. The dyestuff is dried at 50° in vacuo. It has the formula

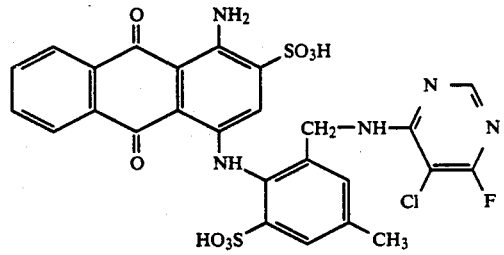

$\lambda_{max}$ = 616 nm,
582 nm
in H$_2$O

Using the application techniques in the printing process and the padding process customary for reactive dyestuffs, the dyestuff produces brilliant reddish blue dyeings on cotton which have very good light and wet fastness properties, high resistance not only to acid hydrolysis but also to oxidative cleavage of the fibre/dyestuff bond.

EXAMPLE 2

30.0 golf-amino-4-(2',6'-dimethyl-3'-methylaminomethyl-phenylamino)anthraquinone-2,4'- -and -2,5'-disulphonic acid mixture of isomers are dissolved in 210 ml of water at a pH of 7 with the addition of about 55 ml of 2N sodium hydroxide solution and at 45°. The solution is cooled to 25°, and 9.9 g of 5-chloro-4,6-difluoropyrimidine are added dropwise in melted form over a period of 15 minutes. During the dropwise addition and later on, the pH is maintained at 6.5-7.0 and the temperature at 25°-30°. Stirring of the mixture under the conditions mentioned is continued until the consumption of sodium hydroxide solution is complete. The dyestuff solution obtained is run into a suspension of 70 g of sodium chloride in 300 ml of 25 % strength sodium chloride solution, stirring is continued for a few hours, the precipitated dyestuff is filtered off with suction, washed with sodium chloride solution and dried at 50° in vacuo.

It has the formula

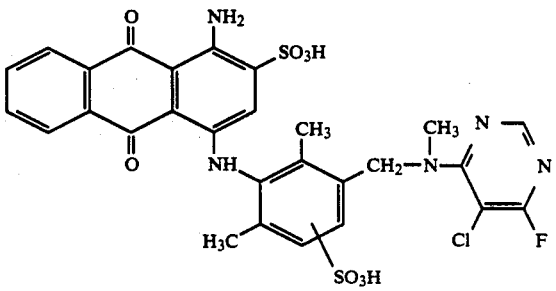

-continued
$\lambda_{max}$ = 625 nm,
585 nm
in H$_2$O

Using the printing and dyeing processes known for reactive dyestuffs, the dyestuff produces brilliant reddish blue dyeings on cotton which have very good light and wet fastness properties, in particular high resistance to acid hydrolysis and oxidative influences, such as chlorine or perborate.

Further dyestuffs of the general formula I which produce brilliant reddish-blue dyeings on cotton having similar fastness properties are obtained by reacting (VII) with the following anthraquinone dyestuff components:

| No. | Anthraquinone compound | Shade |
|---|---|---|
| 3 | 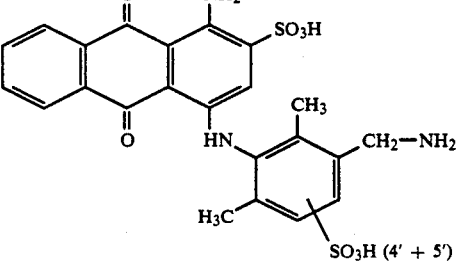 | clear reddish blue |
| 4 | 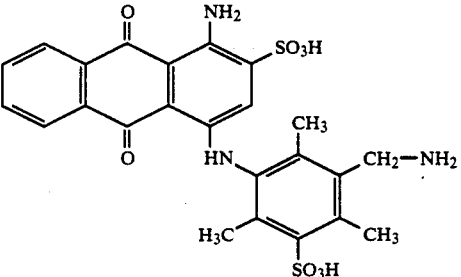 | clear reddish blue |
| 5 | 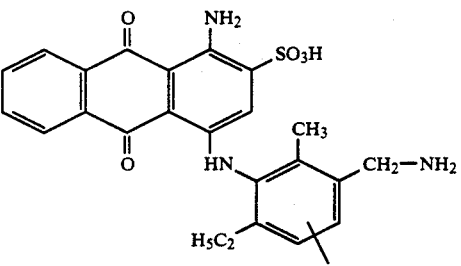 | clear reddish blue |
| 6 | 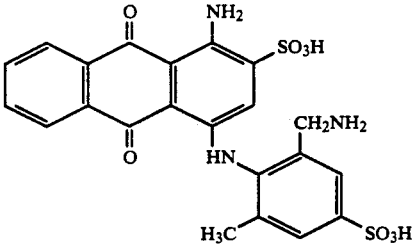 | clear reddish blue |
| 7 | 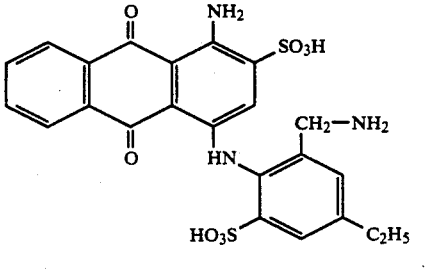 | clear reddish blue |

-continued
| No. | Anthraquinone compound | Shade |
|---|---|---|
| 8 | 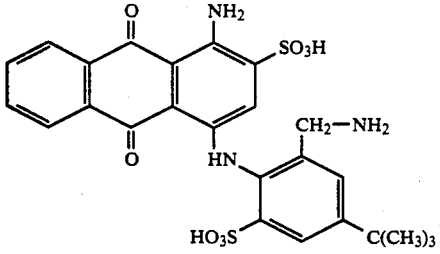 | clear reddish blue |
| 9 | 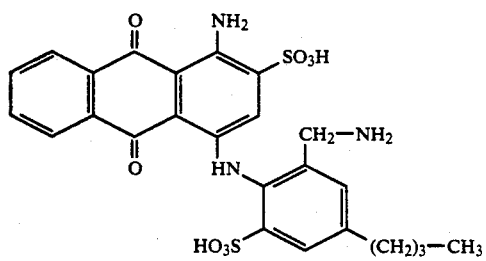 | clear reddish blue |
| 10 | 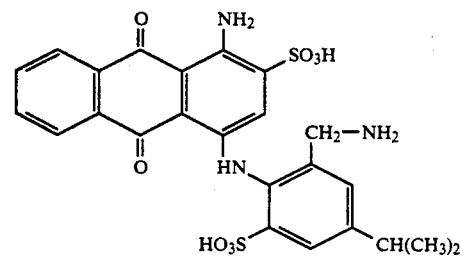 | clear reddish blue |
| 11 | 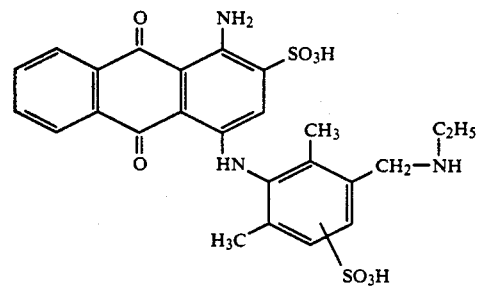 | clear reddish blue |
| 12 | 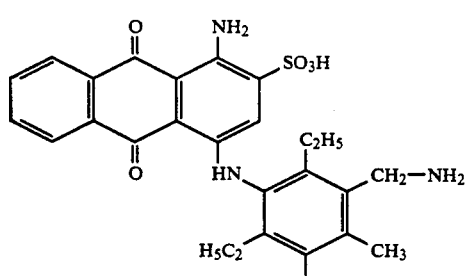 | clear reddish blue |
| 13 | 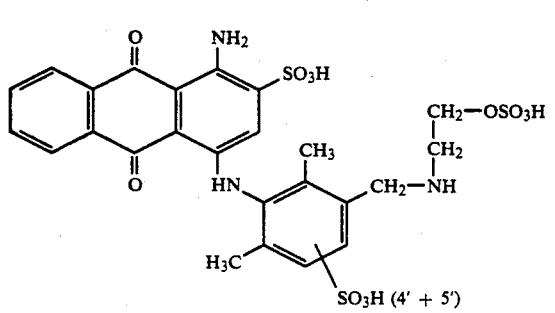 | clear reddish blue |

| No. | Anthraquinone compound | Shade |
|---|---|---|
| 14 | 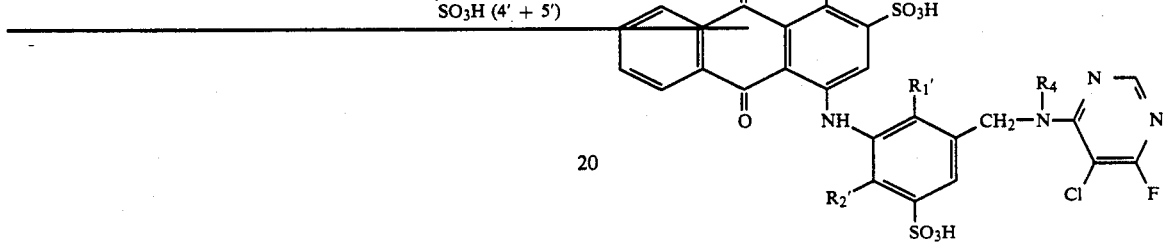 | clear reddish blue |

We claim:
1. A dyestuffs of the formula

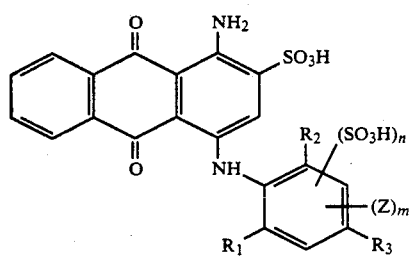 (I)

in which

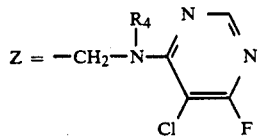

$R_1 = C_1-C_2$-alkyl, $SO_3H$
$R_2 = C_1-C_2$-alkyl, Z
$R_3 = H$, $C_1-C_4$-alkyl, $SO_3H$
$R_4 = H$, substituted or unsubstituted $C_1-C_4$-alkyl
$m = 0$ or $1$
$n = 0$ or $1$
with the proviso that m is 0, if $R_2$ is Z, and n is 0, if $R_1$ and/or $R_3$ is $SO_3H$.

2. Dyestuffs of claim 1 of the formula

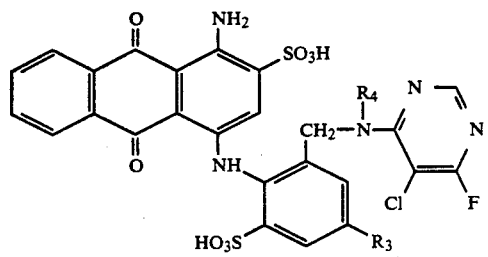

where $R_3' = C_1-C_4$-alkyl.

3. Dyestuffs of claim 1 of the formulae

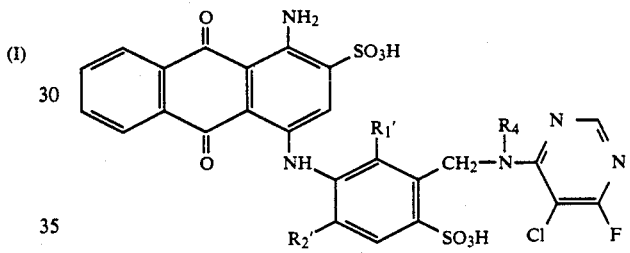

where $R_1'$, $R_2' = c_1-c_2$-alkyl.

4. Dyestuffs of claim 1 of the formula

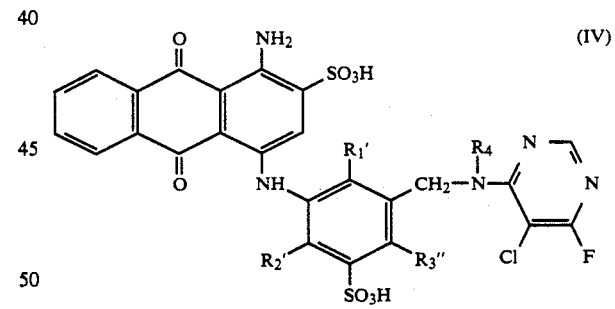 (IV)

in which
$R_3'' = c_1-C_2$-alkyl and $R_1'$, $F_2'$ have the meaning given in claim 3.

5. Dyestuffs of claim 1 wherein $R_4 = H$ or $CH_3$.

6. Dyestuff of the formula

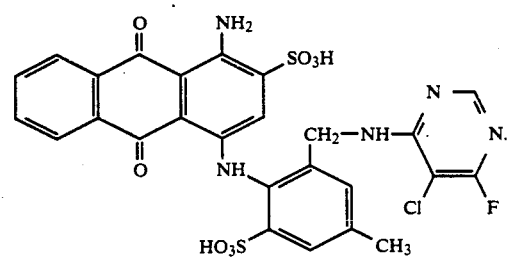

* * * * *

UNITED STATES PATENT AND TRADEMARK OFFICE
CERTIFICATE OF CORRECTION

PATENT NO. : 5,194,612

DATED : March 16, 1993

INVENTOR(S) : Harms et al.

It is certified that error appears in the above-identified patent and that said Letters Patent is hereby corrected as shown below:

Col. 4, line 36   Delete " golf " and substitute -- g of 1 --

Col. 9, line 26   After " 1 "  delete " A "

Col. 9, line 49   Delete " $C_1-c_2$-alkyl " and substitute -- $C_1-C_2$-alkyl --

Col. 9, line 50   Delete " $R_3$-- " and substitute -- $R_3=$ --

Col. 9, line 51   Delete " $r_4$ " and substitute -- $R_4$ --

Col. 10, line 38  Delete " $c_1-c_2$-alkyl " and substitute -- $C_1-C_2$-alkyl --

Col. 10, line 54  Delete " $c_1-C_2$-alkyl and $R_1'$, $F_2'$ " and substitute
                  -- $C_1-C_2$-alkyl and $R_1'$, $R_2'$ --

Signed and Sealed this

Eighth Day of February, 1994

BRUCE LEHMAN

*Attest:*

*Attesting Officer*          *Commissioner of Patents and Trademarks*